3,282,882
Patented Nov. 1, 1966

3,282,882
ALLYLIC COMPOUNDS DERIVED FROM HALOGENATED POLYPHENOLS AND FIREPROOFING AGENTS AND PROCESS FOR PREPARATION OF SAME
Jacques Vuillemenot, La Mulatiere, Maurice Troussier, Pierre-Benite, and Edouard Grimaud, Oullins, France, assignors to Societe d'Electro-Chimie, d'Electro Metallurgie et des Acieries Electriques d'Ugines, Paris, France, a corporation of France
No Drawing. Filed Feb. 6, 1963, Ser. No. 256,552
Claims priority, application France, Feb. 10, 1962, 887,627; July 23, 1962, 904,795
9 Claims. (Cl. 260—37)

This invention relates to:
(1) New allylic polyfunctional compounds derived from halogenated polyphenols and in particular from the perchloropolyphenols obtained by phenolization of decachlorodiphenyl with the aid of an alkaline agent, and to the process for preparation of same.

These compounds have the general formula:

$$(CH_2=CH-CH_2-O)_nR$$

in which $n$ is a integer number which has values from 2 to 4, and R is a halogenated radical having the valency $n$ and is derived from diphenyl.

These compounds are obtained by the reaction of the allyl chloride on an alkaline salt of halogenated polyphenols and in particular on the alkaline salt of the various isomers of octochlorodihydroxydiphenyl. These various isomers are obtainable, for example, according to the process of Ludovic Parvi, which process is the subject of U.S. patent application Serial No. 172,846, filed February 13, 1962, now U.S. Pat. No. 3,243,464 and relates to "Process of Preparing and Purifying Octochlorodihydroxydiphenyl."

(2) The derivatives of the allylic polyfunctional compounds of (1) which derivatives have the general formula:

$$(YCH_2-CHX-CH_2-O)_nR$$

in which:
Y represents either a halogen atom such as fluorine, chlorine, bromine, or a halogenated radical derived from methane, such as, —$CCl_3$, —$CBr_3$, —$CF_3$,
X represents either an atom of hydrogen, or a halogen atom such a fluorine, chlorine, bromine,
$n$ is a integer number which has values from 2 to 4, and R is a halogenated radical having the valency $n$ and is derived from diphenyl.

They are obtained according to conventional processes by the addition of or saturation with halogens such as fluorine, chlorine, bromine, or of halogenated compounds of methane such as, for example, carbon tetrachloride, carbon tetrabromide, trichloromethane, tribromomethane, trichloromonobromomethane, to the ethylenic linkages of the compounds according to (1).

The allylic compounds according to (1) possess the advantage over the other well known allylic monomers, such as the phthalates of di-allyl, for example, of being halogenated, and by virtue thereof they may be used in the preparation of resins having satisfactory flame-resisting properties.

The derivatives according to (2) which are called fireproofing agents herein, are solids at ambient temperature and they are soluble in the majority of the conventional organic solvents. By virtue of their very structure, they are apt to release molecules of hydrohalogenous acids at high temperature, according to the following reaction:

$$-CHX-CH_2- \rightarrow -CH=CH- + HX$$

This reaction may be closely similar to that of the thermal degradation of polyvinyl chloride. The thermal stability of these fireproofing agents is enchanced by addition thereto of stabilizing compounds which assure polyvinyl chloride of satisfactory resistance against heat.

The fireproofing agents of the present invention are appropriate to reduce the inflammability of thermoplastic resins such as polyethylene, polypropylene, polyisobutylene, polystyrene, poly alpha-methylstyrene, the polymers of acrylic acids and/or esters and/or those of methacrylic acids and/or esters, vinyl polyacetate, polyacrylonitrile, polyesters, polyurethanes, polyamides and/or their interpolymers, as well as thermosetting resins such as epoxy, ureaformol, melamine-formol and phenol-formol.

The quantities of fireproofing agents used to reduce inflammability, or to obtain complete self-extinguishing properties, vary with the fireproofing agent itself (nature of the halogen and halogen content) and with the nature of the polymer. In general, these quantities are between 5% and 40% by weight in relation to the polymer. The term "self-extinguishing" is applied to mixtures which burn or carbonize while in actual contact with a flame but which are extinguished automatically as soon as they are withdrawn from said flame.

The fireproofing agents of the present invention are advantageously used in mixture with known fireproofing substances, for example, phosphate of tri(2-3 dibromo propyl), phosphate of tribromomethyl, pentabromophenol and decachlorodiphenyl. They are also employed in combination with antimony oxide, the quantities of the latter varying from 2% to 20% by weight in relation to the polymer.

The polymers used to prepare mixtures difficult to ignite, in some instances contain the usual fillers, pigments, lubricating agents and stabilizing agents.

The incorporation of the fireproofing agents into the polymer is performed either before polymerization by placing them in solution in the monomer which is to be polymerized, or after polymerization by simple admixture in a mixture of the powdered polymer and the fireproofing agent. Mixtures of this nature contingently contain usual filling substances, pigments, antimony oxide and may be rolled, injected, spun, extruded, drawn or formed under vacuum. In the case of paints and varnishes, they may be introduced in the form of solutions in a solvent.

The mixtures just described, besides being particularly difficult to ignite, also possess satisfactory mechanical properties, and may consequently be applied in all fields requiring materials difficult to ignite (buildings, linings or facings, electrical and/or electronic industries).

The first following, non-limiting example describes the preparation of an allylic compound according to (1); the next example describes the preparation of a fireproofing agent according to (2); and Examples 3 to 6 describe mixtures made with the fireproofing agent in the presence or absence of antimony oxide. In all these examples, the parts represent weights and the flame-resistant properties have been determined according to the standardized U.S.A. test method ASTM D635–56T, the figures specified being the means of two readings.

*Example 1.—Preparation of bis(allyloxy) octochlorodiphenyl*

1386 g. of octochlorodihydroxydiphenyl or 3 mols. thereof, 340 g. of potash in lozenges or 6.06 mols. thereof, and 1500 cc. of ethanol were introduced in this order into a 5-liter reactor, equipped with a mechanical stirrer, a condenser, a dropping funnel and a nitrogen supply point.

The mixture was agitated under nitrogen at normal temperature, until a homogeneous mass was obtained, to which 980 cc. of allyl chloride or 12 mols. thereof was then added.

Reflux heating was carried out for 9 hours, the excess of ethanol and allyl chloride then being distilled to form a reactive mass.

This reactive mass was dissolved in 2000 cc. of ether to form an etherified solution and potassium chloride formed during the reaction was eliminated by filtering.

The etherified solution was first washed with an aqueous 10% sodium hydroxide solution to eliminate, in the form of its alkaline salt, the non-reacted diphenol, and then with distilled water until neutralization and complete disappearance of the chlorine ions.

After distillation of the ether, 1430 g. were collected of a yellow product which melts at approximately 35° C.–40° C. and which is soluble in aromatic hydrocarbons, alcohols, ether dioxane, the chlorinated solvents such as carbon tetrachloride and chloroform.

The product obtained has the following characteristics:
Chlorine, percent: Calculated 52.4; found 51.7. OH, percent: Theoretical 0; found by infrared analysis 0.04. Number of ethylenic linkages per 100 g.: Theoretical 0.37; found 0.38.

*Example 2*

This example covers the preparation of the tetrabromo-derivative of bis(allyloxy)octochlorodiphenyl. Its formula is the following:

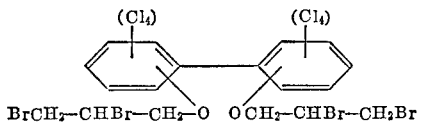

$$BrCH_2-CHBr-CH_2-O \quad OCH_2-CHBr-CH_2Br$$

542 g. or 1 mol. of bis(allyloxy)octochlorodiphenyl and 1200 cc. of ordinary ether were introduced in this order into a 2-liter glass reactor equipped with a mechanical stirrer, a condenser, a dropping funnel and a thermometer. Stirring was performed at ambient temperature until a clear etheric solution was obtained, the reactor then being placed in a bath consisting of ice and sodium chloride.

When the temperature within the reactor reached 0° C., bromine was added drop by drop until a persistent brown coloration of the etheric solution was attained, requiring 330 g. or 2.06 mols. of bromine. During said addition, which lasted two hours, the temperature of the reactive medium never exceeded 5° C.

After addition of bromine, stirring was continued for some 30 minutes, and a concentrated sodium thiosulphate was then added slowly until complete discoloration occurred in the etheric solution.

Filtration was then carried out and an etheric phase was recovered by decanting, which etheric phase was then washed with distilled water until all formed mineral salts were wholly eliminated.

After distillation of ether, 735 g. of a yellow product were obtained which product is solid at ambient temperature, and soluble in the majority of conventional solvents, such as alcohols, ether, carbon tetrachloride, chloroform aromatic hydrocarbons. This product has the following characteristics:

Percent of chlorine: Calculated 32.9; determined 34.3. Percent of bromine: Calculated 37.1; determined 33.5.

It can be stabilized by example by the incorporation at 50° C. of 3% of an epoxidized soyabean oil, some of which is sold under the brand Ecepox PBI.

*Example 3*

Mixtures of variable composition were prepared of powdered polystyrene and of the fireproofing agent stabilized as described in Example 2. The polystyrene employed was the product sold under the name of Lustrex HF77 by the Monsanto Company. The mixtures were processed into sheets having a thickness of 3 mm. by calendering at 150° C. Test specimens of the size 127 x 12.7 x 3 mm. were cut from these sheets and subjected to the ignition test. The results obtained were as follows:

| Mixtures | | Inflammability | |
| --- | --- | --- | --- |
| Lustrex HF77 | Fireproofing Agent | Unit | Results |
| 100 p | 0 | Mm./minute | 37. |
| 80 p | 20 p | Mm./minute | Self-extinguishing. |
| 60 p | 40 p | Mm./minute | Self-extinguishing. |

*Example 4*

Mixtures of variable compositions were prepared of powdered polymethylmethacrylate resin and the stabilized fireproofing agent described in Example 2, in the presence or absence of antimony oxide. The resin is the product sold under the brand Diakon IC by Imperial Chemical Industries. The mixtures were processed into sheets of a thickness of 3 mm. by calendering at 180–190° C.

Test specimens of 127 x 12.7 x 3 mm. were cut from these sheets and subjected to the ignition test. The results obtained were as follows:

| Mixtures | | | Inflammability | |
| --- | --- | --- | --- | --- |
| Diakon IC | Fireproofing Agent | $Sb_2O_3$ | Unit | Results |
| 100 p | 0 | 0 | Mm./minute | 71. |
| 90 p | 10 p | 0 | Mm./minute | 45. |
| 90 p | 10 p | 10 p | Mm./minute | 36. |
| 80 p | 20 p | 0 | Mm./minute | 42. |
| 80 p | 20 p | 10 p | Mm./minute | Self-extinguishing. |
| 60 p | 40 p | 0 | Mm./minute | Self-extinguishing. |

*Example 5*

Mixtures of variable compositions were prepared of HP polyethylene and the stabilized fireproofing agent described in Example 2, in presence or absence of antimony oxide.

These mixtures were processed into sheets by calendering at 120° C. and test specimens of 127 x 12.7 x 3 mm. were made by molding of the sheets at 110° C. under 37.5 kg./cm.²

These test specimens subjected to the ignition test produced the following results:

| Mixtures | | | Inflammability | |
| --- | --- | --- | --- | --- |
| Polyethylene | Fireproofing Agent | $Sb_2O_3$ | Units | Results |
| 100 p | 0 | 0 | Mm./minute | 20. |
| 90 p | 10 p | 0 | Mm./minute | 20. |
| 90 p | 10 p | 10 p | Mm./minute | 15. |
| 90 p | 10 p | 20 p | Mm./minute | 10. |
| 80 p | 20 p | 0 | Mm./minute | Self-extinguishing. |

*Example 6*

Mixtures of variable composition were prepared of powdered acrylonitrile-butadiene-styrene resin and the stabilized fireproofing agent described in Example 2, with or without antimony oxide. In all these mixtures, a lubricating agent was added in the proportion of 3% relative to the resin. The resin was the product sold under the brand Kralastic MH by the United States Rubber Company, and the lubricating agent was a special wax sold under the brand Acrawax C by the firm Glyco Product Co.

These mixtures were calendered at 154° C., then molded at 160° C. under 37.5 kg./cm.² to obtain test specimens 127 x 12.7 x 3 mm. These latter were subjected to the ignition test and produced the following results:

| Mixtures | | | | Inflammability | |
|---|---|---|---|---|---|
| Kralastic MH | Acrawax C | Fireproofing Agent | $Sb_2O_3$ | Units | Results |
| 100 p | 3 p | 0 | 0 | Mm./minute | 38. |
| 85 p | 2.55 p | 15 p | 0 | Mm./minute | 25. |
| 85 p | 2.55 p | 15 p | 5 p | Mm./minute | Self-extinguishing. |
| 80 p | 2.4 p | 20 p | 0 | Mm./minute | 20. |
| 80 p | 2.4 p | 20 p | 10 p | Mm./minute | Self-extinguishing. |

We claim:
1. A product comprising at least one inflammable polymer and a derivative of an allylic polyfunctional compound having the formula

$$(CH_2=CH-CH_2-O)_nR$$

in which $n$ is a cardinal number with values from 2 to 4 and R is a halogenated diphenyl radical having the valency $n$; said derivative having the formula $$(YCH_2-CHX-CH_2-O)_{n_1}R_1$$

in which Y is a member selected from the group consisting of an atom of fluorine, chlorine, bromine, and a halogenated methyl radical, X is a member selected from the group consisting of an atom of hydrogen, an atom of fluorine, chlorine and bromine, $n_1$ is a cardinal member with values from 2 to 4 and $R_1$ is a halogenated diphenyl radical having the valency $n_1$.

2. The product of claim 1 characterized by said product including antimony oxide in an amount between 2% and 20% by weight of said inflammable polymer.

3. The product of claim 1 characterized by said inflammable polymer being at least one thermoplastic resin.

4. The product of claim 3 characterized by said thermoplastic resin being selected from the group consisting of polyethylene, polypropylene, polyisobutylene, polystyrene, and acrylic esters, the polymers of methacrylic acids and poly-alpha-methylstyrene, the polymers of acrylic acids methacrylic esters, vinyl polyacetates, polyacrylonitrile, polyesters, polyurethanes, polyamides and their interpolymers.

5. The product of claim 3 characterized by said product including antimony oxide in an amount between 2% and 20% by weight of said polymer.

6. The product of claim 1 characterized by said inflammable polymers being thermosetting resins.

7. The product of claim 6 characterized by said thermosetting resins being selected from the group consisting of epoxies, urea-formaldehyde, melamine-formaldehyde, and phenol-formaldehyde.

8. The product of claim 6 characterized by said product including antimony oxide in an amount between 2% and 20% by weight of said thermosetting resin.

9. The product of claim 1 characterized by said product including a fireproofing substance selected from the group consisting of phosphate of tri(2,3-dibromopropyl), phosphate of tribromomethyl, pentabromophenol and decachlorodiphenyl.

No references cited.

MORRIS LIEBMAN, *Primary Examiner.*

J. S. WALDRON, *Assistant Examiner.*

UNITED STATES PATENT OFFICE
CERTIFICATE OF CORRECTION

Patent No. 3,282,882                      November 1, 1966

Jacques Vuillemenot et al.

It is hereby certified that error appears in the above numbered patent requiring correction and that the said Letters Patent should read as corrected below.

Column 1, line 23, in the formula, for "$(CH_2=CH-CH_2-O)_{17}R$" read -- $(CH_2=CH-CH_2-O)_nR$ --; column 4, Examples 3 through 6, under the heading "Unit", for "Mm./minute" read -- mm/minute --.

Signed and sealed this 5th day of September 1967.

(SEAL)
Attest:

ERNEST W. SWIDER                      EDWARD J. BRENNER
Attesting Officer                         Commissioner of Patents